(12) United States Patent
Yang et al.

(10) Patent No.: US 10,034,145 B2
(45) Date of Patent: Jul. 24, 2018

(54) LOCALIZING MOBILE DEVICE IN VEHICLE

(71) Applicant: Harman International Industries, Incorporated, Stamford, CT (US)

(72) Inventors: Zeng Yang, Shanghai (CN); Qingshan Zhang, Shanghai (CN); Guoxia Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/111,473

(22) PCT Filed: Jan. 16, 2014

(86) PCT No.: PCT/CN2014/070700
§ 371 (c)(1),
(2) Date: Jul. 13, 2016

(87) PCT Pub. No.: WO2015/106415
PCT Pub. Date: Jul. 23, 2015

(65) Prior Publication Data
US 2016/0353251 A1    Dec. 1, 2016

(51) Int. Cl.
*H04W 24/00*    (2009.01)
*H04W 4/04*    (2009.01)
(Continued)

(52) U.S. Cl.
CPC ............... *H04W 4/046* (2013.01); *G01S 5/26* (2013.01); *G01S 5/30* (2013.01)

(58) Field of Classification Search
CPC .......... H04W 4/02; H04W 4/046; G01S 5/26; G01S 5/30; G10K 11/002; G10L 19/018; H04R 5/02
(Continued)

(56) References Cited

U.S. PATENT DOCUMENTS 8,977,330 B2 * 3/2015 Ozaki ................. H04M 1/6091
455/569.2
9,165,547 B2 * 10/2015 Nguyen .................... G01S 5/26
(Continued)

FOREIGN PATENT DOCUMENTS

| EP | 2708912 A1 | 3/2014 |
| WO | 2006059299 A2 | 6/2006 |
| WO | 2014006745 A1 | 1/2014 |

OTHER PUBLICATIONS

ISA State Intellectual Property Office of the People's Republic of China, International Search Report and Written Opinion Issued in Application No. PCT/CN2014/070700, dated Jun. 27, 2014, WIPO, 13 pages.
(Continued)

*Primary Examiner* — Huy C Ho
(74) *Attorney, Agent, or Firm* — McCoy Russell LLP (57) ABSTRACT

Method and system for localizing a mobile device in a vehicle is provided. The method may include: triggering an audio system mounted on a vehicle, which audio system includes a plurality of speakers, to play an acoustic signal; and calculating a position of a mobile device in the vehicle based on a recording of the audio system's playback of the acoustic signal, which is recorded by the mobile device, and position information of the plurality of speakers. Localization may be more accurate.

21 Claims, 4 Drawing Sheets

(51) Int. Cl.
   *G01S 5/26*   (2006.01)
   *G01S 5/30*   (2006.01)
   *H04M 3/00*   (2006.01)
(58) Field of Classification Search
   USPC .................................................... 455/456.1
   See application file for complete search history.

(56) References Cited

U.S. PATENT DOCUMENTS

| | | |
|---|---|---|
| 2006/0256976 A1 | 11/2006 | House |
| 2009/0149202 A1 | 6/2009 | Hill et al. |
| 2012/0220283 A1 | 8/2012 | Tadayon et al. |
| 2013/0336094 A1* | 12/2013 | Gruteser ................. G01S 11/14 367/117 |
| 2015/0204965 A1 | 7/2015 | Magarida et al. |

OTHER PUBLICATIONS

Rishabh, I. et al., "Indoor localization using controlled ambient sounds," Proceedings of the 2012 International Conference on Indoor Positioning and Indoor Navigation (IPIN), Nov. 13, 2012, Sydney, Australia, 10 pages.

European Patent Office, Extended European Search Report Issued in Application No. 14879177.5, dated Aug. 31, 2017, Germany, 11 pages.

* cited by examiner

FIG. 5

LOCALIZING MOBILE DEVICE IN VEHICLE

CROSS REFERENCE TO RELATED APPLICATIONS

The present application is a U.S. National Phase of International Patent Application Serial No. PCT/CN2014/070700, entitled "LOCALIZING MOBILE DEVICE IN VEHICLE," filed on Jan. 16, 2014, the entire contents of which are hereby incorporated by reference for all purposes.

TECHNICAL FIELD

The present disclosure generally relates to localizing mobile device in vehicle.

BACKGROUND

Knowing who is sitting on which seat of a vehicle may be very useful, for example, a seat in a vehicle may be automatically adjusted to a posture preferred by a user, an air conditioning device may be automatically adjusted to a setting preferred by a user, and so on. Nowadays, more and more people carry at least one mobile device with them, such as a cell phone, a pad, and the like. Therefore, localizing a mobile device in a vehicle may be useful.

SUMMARY

According to one embodiment, a method for localizing a mobile device in a vehicle is provided. The method may include: triggering an audio system mounted on a vehicle, which audio system includes a plurality of speakers, to play an acoustic signal; and calculating a position of a mobile device in the vehicle based on a recording of the audio system's playback of the acoustic signal, which is recorded by the mobile device, and position information of the plurality of speakers.

In some embodiments, the audio system's playback of the acoustic signal may be triggered by the mobile device.

In some embodiments, each of the plurality of speakers plays a part of the acoustic signal, and the position of the mobile device may be calculated based on time differences of arriving at the mobile device between the parts.

In some embodiments, the method may further include: determining on which seat of the vehicle the mobile device is located based on the calculated position of the mobile device.

In some embodiments, each part of the acoustic signal may have a self-correlation coefficient greater than a cross-correlation coefficient with any other part. In some embodiments, the acoustic signal may be substantially inaudible, for example, its frequency may range from about 16 KHz to about 24 KHz.

In some embodiments, the position of the mobile device may be calculated based on cross-correlation between the acoustic signal and the recording. In some embodiments, calculating the position of the mobile device may include: multiplying each part of the acoustic signal and a corresponding part of the recording; transforming the multiplied results from time domain into frequency domain to obtain corresponding frequency shifts; and calculating time differences of arriving at the mobile device between the parts based on the obtained frequency shifts.

In some embodiments, the multiplied results may be transformed into frequency domain using a Fast Fourier Transform (FFT) method.

In some embodiments, parts corresponding to the acoustic signal may be selected in the recording based on their magnitudes.

In some embodiments, the parts corresponding to the acoustic signal may be selected in the recording using a moving average method.

According to one embodiment, a system for localizing a mobile device in a vehicle is provided. The system may include: an audio system mounted on a vehicle, which audio system includes a plurality of speakers for playing an acoustic signal; and a processing device for calculating a position of a mobile device in the vehicle based on a recording of the audio system's playback of the acoustic signal, which is recorded by the mobile device, and position information of the plurality of speakers.

In some embodiments, audio system may include a head unit. In some embodiments, the processing device is embedded in the head unit, and the head unit may further include a communication device for receiving the recording from the mobile device. In some embodiments, the processing device may be embedded in the mobile device.

In some embodiment, the audio system's playback of the acoustic signal may be configured to be triggered by the mobile device.

In some embodiments, each of the plurality of speakers may be configured to play a part of the acoustic signal, and the processing device may be configured to calculate the position of the mobile device based on time differences of arriving at the mobile device between the parts.

In some embodiments, the processing device may be further configured to determine on which seat of the vehicle the mobile device is located based on the calculated position of the mobile device.

In some embodiments, the audio system may be configured to play the acoustic signal each part of which has a self-correlation coefficient greater than a cross-correlation coefficient with any other part. In some embodiments, the acoustic signal may be substantially inaudible, for example, its frequency may range from about 16 KHz to about 24 KHz.

In some embodiments, the processing device may be configured to calculate the position of the mobile device based on cross-correlation between the acoustic signal and the recording. In some embodiments, the processing device may be configured to: multiply each part of the acoustic signal and a corresponding part of the recording; transform the multiplied results from time domain into frequency domain to obtain corresponding frequency shifts; and calculate time differences of arriving at the mobile device between the parts based on the obtained frequency shifts.

In some embodiments, the processing device may be configured to transform the multiplied results into frequency domain using a Fast Fourier Transform (FFT) method.

In some embodiments, the processing device may be configured to select, in the recording, parts corresponding to the acoustic signal based on their magnitudes.

In some embodiments, the processing device may be configured to select the parts corresponding to the acoustic signal using a moving average method.

According to one embodiment of the present disclosure, a non-transitory computer readable medium, which contains a computer program for calculating a position of a first device, is provided. When the computer program is executed by a processor, it will instruct the processor to: obtain a recording of an acoustic signal played by a plurality of speakers, where the recording is recorded by the first device; obtain position information of the plurality of speakers; and calculate a position of the first device based on cross-correlation between the acoustic signal and the recording.

In some embodiments, when the computer program is executed by a processor, it will instruct the processor to: multiply each part of the acoustic signal and a corresponding part of the recording; transform the multiplied results from time domain into frequency domain to obtain corresponding frequency shifts; and calculate time differences of arriving at the mobile device between the parts based on the obtained frequency shifts.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 1:
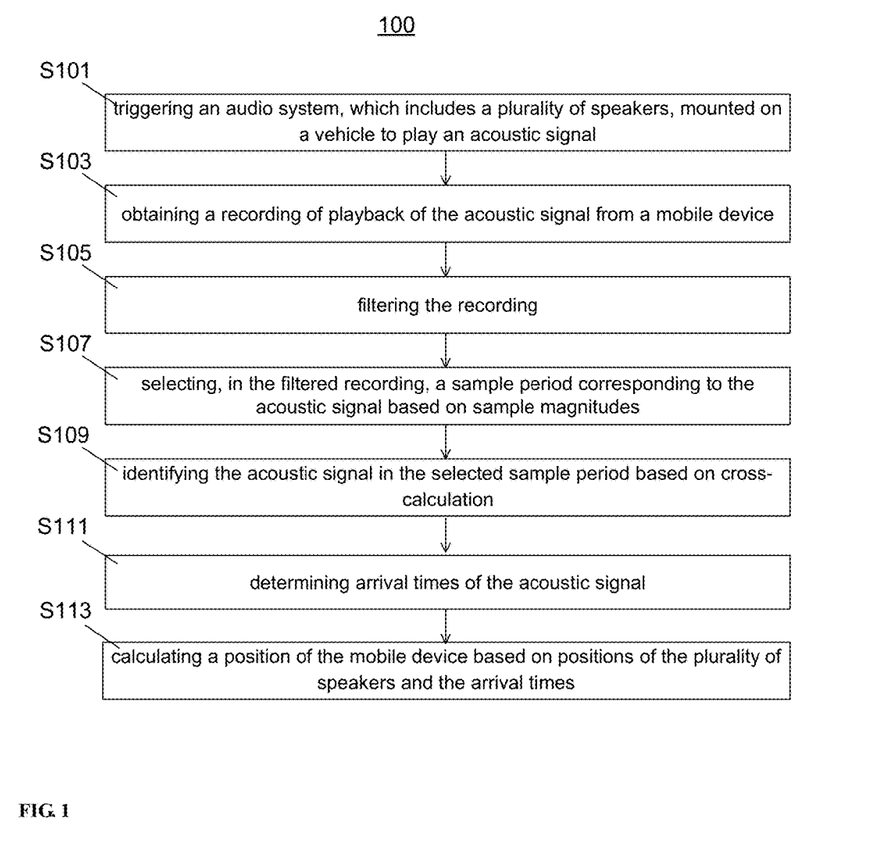
FIG. 1 schematically illustrates a method for localizing a mobile device in a vehicle according to one embodiment.

FIG. 1 schematically illustrates a method 100 for localizing a mobile device in a vehicle according to one embodiment. The method 100 may be used to localize a mobile device, such as a mobile phone, a pad, or the like, inside a vehicle. The position of the mobile device may be determined based on spatial relationship between the mobile device and some immobile devices in the vehicle. For example, a time-of-arrival (TOA) method, a time-difference-of-arrival (TDOA) method, or the like, may be used.

In S101, triggering an audio system, which includes a plurality of speakers, mounted on a vehicle to play an acoustic signal.

The audio system may include a plurality of speakers each of which can play a part of the acoustic signal. Distances between the speakers and a mobile device which receives the parts of the acoustic signal may be determined based on when the parts of the acoustic signal arrive at the mobile device (hereinafter as "arrival times") and transmitting speeds of acoustic signal. Thereafter, the position of the mobile device may be determined based on the distances and position information of the speakers.

The mobile device may take a recording of all received sounds, including the parts of the acoustic signal and probably together with some other acoustic signals like noises or human voice. The parts of the acoustic signal may be respectively identified from the recording in subsequent processing, such that the arrival times can be determined.

In some embodiments, the audio system may include a vehicle-mounted processing device, such as a head unit, for controlling the plurality of speakers to play the acoustic signal. In some embodiments, the head unit may control the plurality of speaker to play the parts of the acoustic signal at different time points. For example, the head unit may control the plurality of speakers to play the parts of the acoustic signal successively at evenly spaced time points. Accordingly, the parts of the acoustic signal can be configured to be the same, since their arrival times may be spaced relatively far away from each other and their corresponding records in the recording may be apart from each other. Nevertheless, the parts of the acoustic signal should be distinct from other acoustic signals received by the mobile device.

In some embodiments, the plurality of speakers may be synchronized to emit the parts of the acoustic signal at the same time point. Accordingly, the parts of the acoustic signal may be configured to distinct from each other, since the arrival times thereof may be very close and their corresponding records in the recording may mingle together. In some embodiments, the self-correlation coefficient of each acoustic signal of the first set may be greater than a cross-correlation coefficient any other part. Such that, the parts of the acoustic signal may be respectively identified from the mingled records.

In some embodiments, chirp acoustic signals may be used as the parts of the acoustic signal, which may have relatively high self-correlation and relatively low cross-correlation.

In some embodiments, the parts of the acoustic signal may be set out of the human hearing limit, i.e., the parts of the acoustic signal may be substantially inaudible, so as to avoid disturbing passengers in the vehicle. Nevertheless, the audio acoustic signals should be sensitive to the mobile device, such that the mobile device can receive the audio acoustic signals and take corresponding records. In some embodiments, each of the audio acoustic signals may be a chirp acoustic signal having a frequency ranging from about 16 kilo Hertz to about 24 kilo Hertz.

Figure 2:
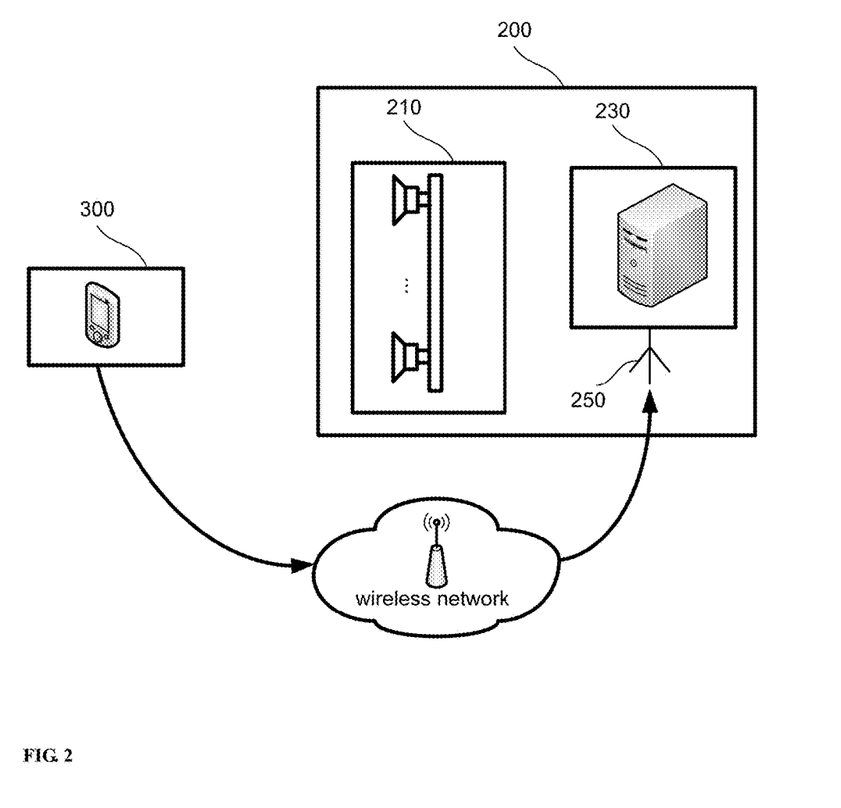
FIG. 2 illustrates a schematic block diagram of a system for localizing a mobile device.

FIG. 2 illustrates a schematic block diagram of a system 200 which may be used to implement the method 100 to localize a mobile device 300. The system 200 may include a plurality of speakers 210, a processing device 230 and a communication device 250. The plurality of speakers 210 may be used to emit the parts of the acoustic signal, the processing device 230 may be used to calculate the position of the mobile device 300 and the communication device 250 may be used to communicate with the mobile device 300.

In some embodiments, the system 200 may include a vehicle mounted head unit which can process data and establish data connection with the mobile device 300. Therefore, the processing device 230 and the communication device 250 may be embedded in the head unit. The head unit may generate the acoustic signal and further control the plurality of speakers 210 to play the acoustic signal. Therefore, in some embodiments, the playback of the acoustic signal may be triggered by operating the head unit. However, in some embodiments, the playback of the acoustic signal may be triggered by the mobile device 300. For example, the mobile device 300 may send to the head unit a message according to which the head unit may control the speakers 210 to play the acoustic signal.

In S103, obtaining a recording of playback of the acoustic signal from a mobile device.

The mobile device 300 may take a recording of received sounds which may include the parts of the acoustic signal and some other acoustic signals, such as noises.

In some embodiments, the mobile device 300 may be controlled to take the recording, and send the recording to the system 200. The recording may be received by the communication device 250 through wireless network, such as by Bluetooth or Wi-Fi. As such, the processing device 230 may implement following processing to calculate a position of the mobile device 300.

In some embodiments, the calculation of the position of the mobile device 300 may be implemented by itself, since nowadays mobile device like smart phones have good computation capabilities. Therefore, the processing device 230 may be embedded in the mobile device 300, and the communication device 250 may be used to receive the calculated result from the mobile device 300.

In S105, filtering the recording.

The recording maybe filtered to remove noises. In some embodiments, as the frequency of the parts of the acoustic signal may be relatively high, a low frequency filter may be applied.

In S107, selecting, in the filtered recording, a sample period corresponding to the acoustic signal based on sample magnitudes.

Figure 3:
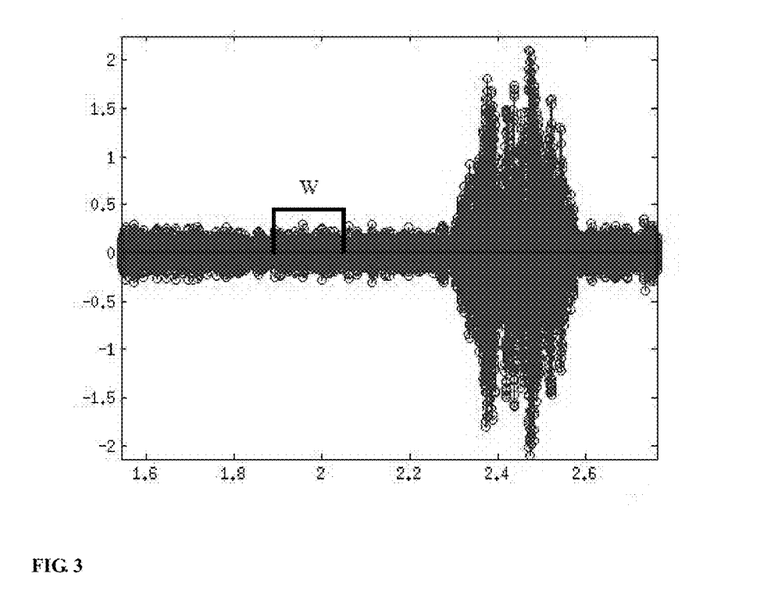
FIG. 3 schematically illustrates a sample sequence of a filtered recording.

FIG. 3 schematically illustrated a sample sequence of the filtered recording, where the x axis stands for sequence number ($x10^4$) and the y axis stands for magnitude. It could be seen from FIG. 3 that the sample sequence may include noises having relatively low magnitudes, such as white noises. Recording parts corresponding to the acoustic signal may have relatively high magnitudes.

In some embodiments, the parts of the acoustic signal may be emitted at the same time point, thus their arrival times may be close. Therefore, there may be one period of sample sequence with relatively high magnitudes, since the records corresponding to the parts of the acoustic signal may mingle together. In some embodiments, the parts of the acoustic signal may be emitted one after another, thus their arrival times may be far away from each other. Therefore, there may be several periods of sample sequence with relatively high magnitudes, each period corresponding to one signal part. However, the sample period corresponding to all or any one of the signal part may be short compared with the whole sample sequence. Therefore, in some embodiments, coarse detection may be performed to approximately select the sample period. In following descriptions, the parts of the acoustic signal may be emitted at the same time point and the number of the sample period may be one, which is merely an example.

Normally, how long it may last for emitting the parts of the acoustic signal can be roughly estimated, so that the length of the sample period can be pre-determined. Therefore, in some embodiments, the coarse detection may be performed to roughly estimate a starting point of the sample period, and a predetermined number of consecutive samples starting from the estimated starting point and having a predetermined length may be selected as the sample period.

In some embodiments, the starting point of the sample period may be determined using a moving average method. Specifically, moving averages of samples in the sample sequence may be calculated. In some embodiments, the moving averages may be calculated based on following equation:

$$A_i = \frac{1}{W} * \sum_{j=i-W+1}^{i} M_j$$

where $A_i$ stands for the moving average of a sample i, W is a predetermined factor, and $M_j$ stands for the magnitude of a sample in W consecutive samples prior to and including the sample i in the sample sequence. A threshold value may be pre-set. If there are S consecutive samples each of which has a moving average larger than the threshold, it may indicate that the sample period may exist near there. In some embodiments, the earliest one of the S consecutive samples may be determined as the starting point of the sample period. A predetermined number of consecutive samples from the determined starting point may be selected, which contain records of the parts of the acoustic signal. In some embodiments, a sample which is a little earlier than the earliest one of the S consecutive samples may be determined as the starting point of the sample period to ensure that the estimated starting point is earlier than the arrival of the parts of the acoustic signal, so that it could be ensured that the selected consecutive samples contain the records of the parts of the acoustic signal.

It should be noted that S105 and S107 may be optional.

In S109, identifying the acoustic signal in the selected sample period based on cross-calculation.

Each part of the acoustic signal may be identified in the predetermined number of consecutive samples, i.e., the sample period, using cross-correlation calculation. Normally, the parts of the acoustic signal and the sample period may be represented in time domain. However, each part of the acoustic signal may have multipath, since it may be reflected by in-vehicle components and arrive at the mobile through different paths. In time domain, it may not be easy to differentiate multipath of a signal part. In some embodiments, the cross-correlation calculation may be implemented in frequency domain, such that differentiating the multipath may be easier.

Specifically, the sample period may be multiplied sample by sample with each part of the acoustic signal to obtain cross-correlation results. In some embodiments, each part of the acoustic signal may be padded with zero to make sure that they have the same length as the sample period, such that the cross-correlation calculation can be implemented. Thereafter, the cross-correlation results may be respectively transformed into frequency domain to obtain frequency shifts corresponding to each path of each signal part. In some embodiments, a fast Fourier transformer (FFT) may be used to transform the cross-correlation result into frequency domain.

Figure 4:
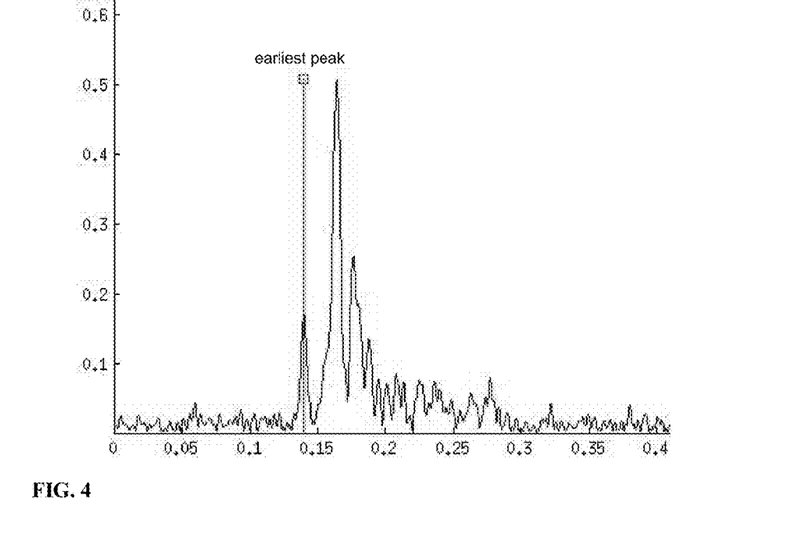
FIG. 4 schematically illustrates frequency shifts corresponding to an acoustic signal.

FIG. 4 schematically illustrated frequency shifts corresponding to a first part of the acoustic signal, where the x axis represents frequency shift and the y axis represents frequency correlation magnitude. As a result of transforming the cross-correlation result from time domain to frequency domain, samples representing the corresponding first part may converge to several peaks having relatively high correlation magnitudes. Each of the peaks may represent one acoustic signal path of the corresponding first part. As such, the corresponding first part may be identified in the selected sample period.

Above processing may be repeated to identify other parts of the acoustic signal.

In S111, determining arrival times of the acoustic signal.

The arrival times of the acoustic signal, i.e., arrival times of the parts of the acoustic signal arriving at the mobile device 300, may be determined based on the frequency shifts. Referring still to FIG. 4, multipath of the first part converges to several peaks. It could be understood that the earliest peak may represent the shortest path, i.e., a straight path from one of the speakers 210 which emits the first part to the mobile device 300. Therefore, the arrival time of the first part may be determined based on the frequency shift position of the earliest peak.

The frequency shift position may represent a radian from the earliest sample in the selected sample period to the earliest peak, which is relative to a time shift from the starting point of the selected sample period to the earliest peak. In some embodiments, the arrival time point of the first part may be determined based on the following equation:

$$T = \frac{F * Fs * (M-1)}{2 * \pi * N}$$

where T stands for a time shift from the starting time point of the selected sample period to the arrival time of the first part, F stands for a frequency shift of the earliest peak of the first part, and Fs, M and N respectively stand for sampling frequency, length and band width of the selected sample period.

In S113, calculating a position of the mobile device based on positions of the plurality of speakers and the arrival times.

Figure 5:
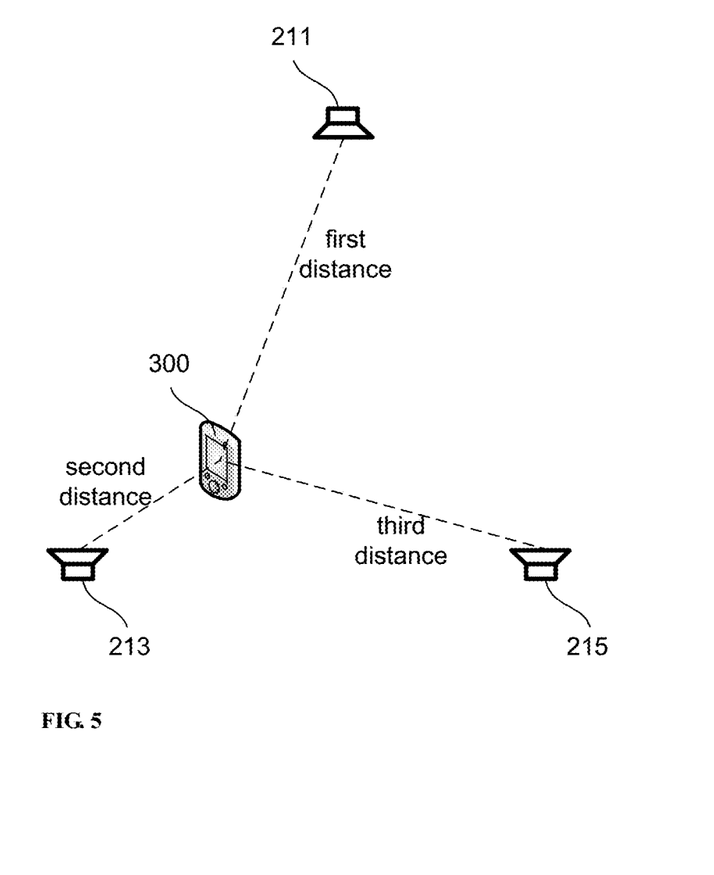
FIG. 5 schematically illustrates calculating a position of a mobile device.

FIG. 5 schematically illustrates calculating the position of the mobile device 300. The plurality of speakers 210 of the system 200 may have three speakers 211, 213 and 215 disposed at different positions of the vehicle. In some embodiments, a time-of-arrival (TOA) method may be used. The arrival time of each acoustic signal part may be reduced by a time point when it is emitted from the corresponding speaker to obtain a travelling period. Based on the travelling periods of the parts of the acoustic signal, a first distance between the speaker 211 and the mobile device 300, a second distance between the speaker 213 and the mobile device 300, and a third distance between the speaker 215 and the mobile device 300, can be calculated. Thus, the position of the mobile device 300 may be estimated based on positions of the speakers 211, 213 and 215, and the first, second and third distances. In some embodiments, a time-difference-of-arrival (TDOA) method may be used to calculate the position of the mobile device. Based on a difference between two arrival times of two acoustic signal parts emitted respectively from the speaker 211 and the speaker 213, a difference D between the first distance and the second distance may be determined. It could be estimated that the mobile device 300 may be located in a hyperbola. Focus points of the hyperbola may be respectively located at positions of the speakers 211 and 213. A distance between the center and one vertex of the hyperbola may be D/2. Forming hyperbolas focusing at other speakers in a similar way and finding intersection points of the hyperbolas, the position of the mobile device 300 can be thus calculated. It should be noted that the number of the speakers are merely an example.

Since the position of the mobile device 300 is calculated, on which seat of the vehicle the mobile device 300 is located can be determined based on the position. In some embodiments, the method 100 may further calculating on which seat in the vehicle the mobile 300 is located based on the calculated position. Such that, various utilizations can be implemented to improve in-vehicle experience of a user holding the mobile device 300.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for localizing a mobile device in a vehicle, comprising:
   triggering an audio system mounted on the vehicle to play a source acoustic signal, the audio system including a plurality of speakers, each speaker being triggered to emit at least a respective part of the source acoustic signal;
   receiving, at a processing device, a recording from the mobile device, the recording including at least recordings of emitted respective parts of the source acoustic signal as captured by the mobile device; and
   calculating, with the processing device, a position of the mobile device in the vehicle based on a sample period of the recording and position information of the plurality of speakers, the sample period being selected based on magnitudes of the recording, and the method further comprising padding each part of the source acoustic signal with zero to make a length of each part of the source acoustic signal equal to a length of the sample period.

2. The method according to claim 1, wherein the audio system's playback of the source acoustic signal is triggered by the mobile device.

3. The method according to claim 1, wherein the position of the mobile device is calculated based on time differences of arriving at the mobile device between the emitted respective parts of the source acoustic signal.

4. The method according to claim 1, wherein each part of the source acoustic signal has a self-correlation coefficient greater than a cross-correlation coefficient with any other part.

5. The method according to claim 1, wherein the position of the mobile device is calculated based on cross-correlation between the source acoustic signal and the recording.

6. The method according to claim 3, wherein calculating the position of the mobile device comprises:
   multiplying each part of the source acoustic signal and a corresponding part of the recording;

transforming the multiplied results from time domain into frequency domain to obtain corresponding frequency shifts; and calculating the time differences of arriving at the mobile device between the emitted respective parts based on the obtained frequency shifts.

7. The method according to claim 6, wherein parts corresponding to the source acoustic signal are selected in the recording based on their magnitudes.

8. The method according to claim 1, further comprising determining on which seat of the vehicle the mobile device is located based on the calculated position of the mobile device.

9. A system for localizing a mobile device in a vehicle, comprising:
an audio system mounted on the vehicle for playing a source acoustic signal, the audio system comprising a plurality of speakers, each speaker configured for emitting at least a respective part of the source acoustic signal; and
a processing device for receiving, from the mobile device, a recording including at least recordings of the emitted respective parts as captured by the mobile device, and for calculating a position of the mobile device in the vehicle based on a sample period of the recording and position information of the plurality of speakers, the sample period being selected based on magnitudes of the recording, and each part of the source acoustic signal being padded with zero to make a length of each part of the source acoustic signal equal to a length of the sample period.

10. The system according to claim 9, wherein the audio system's playback of the source acoustic signal is configured to be triggered by the mobile device, and wherein an estimated starting point of the sample period is performed by coarse detection using a calculation of moving averages of magnitudes of samples in the recording.

11. The system according to claim 9, wherein the processing device is configured to calculate the position of the mobile device based on time differences of arriving at the mobile device between the emitted respective parts of the source acoustic signal.

12. The system according to claim 9, wherein each part of the source acoustic signal has a self-correlation coefficient greater than a cross-correlation coefficient with any other part.

13. The system according to claim 9, wherein the processing device is configured to calculate the position of the mobile device based on cross-correlation between the source acoustic signal and the recording.

14. The system according to claim 11, wherein the processing device is configured to:
multiply each part of the source acoustic signal and a corresponding part of the recording;
transform the multiplied results from time domain into frequency domain to obtain corresponding frequency shifts; and
calculate the time differences of arriving at the mobile device between the emitted respective parts based on the obtained frequency shifts.

15. The system according to claim 14, wherein the processing device is configured to select, in the recording, parts corresponding to the source acoustic signal based on their magnitudes.

16. The system according to claim 9, wherein the processing device is further configured to determine on which seat of the vehicle the mobile device is located based on the calculated position of the mobile device.

17. A method for localizing a mobile device in a vehicle, comprising:
triggering an audio system mounted on the vehicle to play a source acoustic signal, the audio system including a plurality of speakers, each speaker being triggered to emit at least a respective part of the source acoustic signal;
receiving, at a processing device, a recording from the mobile device, the recording including at least recordings of the emitted respective parts as captured by the mobile device;
selecting, in the recording, a sample period corresponding to the source acoustic signal based on sample magnitudes in the recording, the sample period including a predetermined number of consecutive samples starting from an estimated starting point and having a predetermined length, the estimated starting point determined by calculating moving averages of magnitudes of samples in a sample sequence and determining consecutive samples in the sample sequence that have respective moving averages that are larger than a threshold, the sample sequence including the predetermined number of consecutive samples; and
calculating, with the processing device, a position of the mobile device in the vehicle based on the recording and position information of the plurality of speakers, wherein the audio system's playback of the source acoustic signal is triggered by the mobile device, and the position of the mobile device is calculated based on time differences of arriving at the mobile device between the emitted respective parts of the source acoustic signal.

18. The method according to claim 17, wherein each part of the source acoustic signal has a self-correlation coefficient greater than a cross-correlation coefficient with any other part.

19. The method according to claim 18, wherein the position of the mobile device is calculated based on cross-correlation between the source acoustic signal and the recording, and wherein calculating the position of the mobile device comprises:
multiplying each part of the source acoustic signal and a corresponding part of the recording;
transforming the multiplied results from time domain into frequency domain to obtain corresponding frequency shifts; and
calculating the time differences of arriving at the mobile device between the emitted respective parts based on the obtained frequency shifts.

20. The method according to claim 17, further comprising determining on which seat of the vehicle the mobile device is located based on the calculated position of the mobile device, and wherein an earliest sample of a selected number of consecutive number of samples having respective moving averages that are larger than the threshold is selected as the estimated starting point of the sample period.

21. The method according to claim 17, further comprising padding each part of the source acoustic signal with zero to make a length of each part of the source acoustic signal equal to a length of the sample period, wherein the moving averages are calculated based on the following equation:

$$A_i = \frac{1}{W} * \sum_{j=i-W+1}^{i} M_j,$$

where $A_i$ stands for the moving average of a sample i of the sample sequence, W is a predetermined factor, and $M_j$ stands for a magnitude of a sample in W consecutive samples prior to and including the sample i in the sample sequence.

* * * * *